United States Patent
Gunawan et al.

(10) Patent No.: US 12,018,211 B2
(45) Date of Patent: Jun. 25, 2024

(54) INVERTING SURFACTANTS FOR INVERSE EMULSIONS

(71) Applicant: RHODIA OPERATIONS, Lyons (FR)

(72) Inventors: Stanley Gunawan, The Woodlands, TX (US); Zhihua Zhang, Singapore (SG); Shaopeng Zhang, The Woodlands, TX (US); Igor Pimkov, Spring, TX (US); Zhenxing Cheng, Shanghai (CN); Qi Qu, Tomball, TX (US)

(73) Assignee: RHODIA OPERATIONS, Lyons (FR)

( * ) Notice: Subject to any disclaimer, the term of this patent is extended or adjusted under 35 U.S.C. 154(b) by 61 days.

(21) Appl. No.: 17/919,494

(22) PCT Filed: Jun. 9, 2020

(86) PCT No.: PCT/CN2020/095084
§ 371 (c)(1),
(2) Date: Oct. 17, 2022

(87) PCT Pub. No.: WO2021/248305
PCT Pub. Date: Dec. 16, 2021

(65) Prior Publication Data
US 2023/0357629 A1    Nov. 9, 2023

(51) Int. Cl.
*C09K 8/82* (2006.01)
*C09K 8/36* (2006.01)
*C09K 8/60* (2006.01)
*C09K 8/88* (2006.01)
*E21B 43/16* (2006.01)

(52) U.S. Cl.
CPC ............. *C09K 8/82* (2013.01); *C09K 8/36* (2013.01); *C09K 8/602* (2013.01); *C09K 8/882* (2013.01); *E21B 43/16* (2013.01); *C09K 2208/28* (2013.01)

(58) Field of Classification Search
None
See application file for complete search history.

(56) References Cited

U.S. PATENT DOCUMENTS

| | | | |
|---|---|---|---|
| 3,067,987 A | 12/1962 | Ballou et al. | |
| 3,284,393 A | 11/1966 | Vanderhoff et al. | |
| 3,624,019 A * | 11/1971 | Anderson | C02F 1/5227 507/119 |
| 4,024,097 A | 5/1977 | Slovinsky et al. | |
| 4,051,065 A | 9/1977 | Venema | |
| 4,059,552 A | 11/1977 | Zweigle et al. | |
| 4,419,344 A | 12/1983 | Strasilla et al. | |
| 4,522,502 A | 6/1985 | Brazelton | |
| 4,642,222 A | 2/1987 | Brazelton | |
| 4,672,090 A | 6/1987 | Chan | |
| 4,713,431 A | 12/1987 | Bhattacharyya et al. | |
| 4,747,691 A | 5/1988 | Hoffland | |
| 4,772,659 A | 9/1988 | Chan | |
| 5,292,800 A | 3/1994 | Moench et al. | |
| 5,470,150 A | 11/1995 | Pardikes | |
| 6,825,301 B1 | 11/2004 | Cerf et al. | |
| 7,004,254 B1 | 2/2006 | Chatterji et al. | |
| 2014/0144643 A1 | 5/2014 | Frederick et al. | |
| 2016/0251567 A1 * | 9/2016 | Lin | C09K 8/36 507/120 |
| 2017/0226407 A1 * | 8/2017 | Homma | C09K 8/467 |
| 2018/0072935 A1 | 3/2018 | Frederick et al. | |

FOREIGN PATENT DOCUMENTS

| | | | |
|---|---|---|---|
| CN | 102459536 A | 5/2012 | |
| CN | 106661441 A | 5/2017 | |
| CN | 107278223 A | 10/2017 | |
| CN | 108350346 A | 7/2018 | |
| CN | 110499149 A | 11/2019 | |
| WO | WO-2017035317 A1 * | 3/2017 | ............... C09K 8/36 |

OTHER PUBLICATIONS

International Search Report issued in corresponding International Application No. PCT/CN2020/095084; mailed Mar. 12, 2021 (3 pages).
Written Opinion of the International Searching Authority issued in corresponding International Application No. PCT/CN2020/095084; dated Mar. 12, 2021 (4 pages).

* cited by examiner

*Primary Examiner* — John J Figueroa

(74) *Attorney, Agent, or Firm* — Osha Bergman Watanabe & Burton LLP

(57) ABSTRACT

Water-in-oil emulsions are provided that include an alkyl propylene diamine and an ethoxylated alcohol as the inverting surfactant, which is present in an amount less than 5 percent by weight of the water-in-oil emulsion.

17 Claims, No Drawings

INVERTING SURFACTANTS FOR INVERSE EMULSIONS

FIELD

The present disclosure relates to inverting surfactants for water-in-oil emulsions.

BACKGROUND

Aqueous treatment fluids may be used in a variety of subterranean treatments. Such treatments include, but are not limited to, drilling operations, stimulation operations, and completion operations. As used herein, the term "treatment," or "treating," refers to any subterranean operation that uses a fluid in conjunction with a desired function and/or for a desired purpose. The term "treatment," or "treating," does not imply any particular action by the fluid.

Water soluble polymers can be used as friction reducers in well treatment fluids to alter the rheological properties of the fluid so that the turbulent flow is minimized, thereby preventing consequent energy loss in the fluid as it is pumped through the pipe. In some instances, water soluble friction reducing polymers are suspended in water-in-oil emulsions, wherein upon addition to the aqueous treatment fluid, the emulsion must invert to release the friction reducing polymer into the fluid. Performance in the field depends upon the ability of the emulsions to invert, or break, quickly.

Inverting surfactants tend to be very hydrophilic. Typical inverting surfactants include ethoxylated alcohols, which can quickly invert the emulsion. One of the key challenges of using ethoxylated alcohols as inverting surfactants is their impact on emulsion stability. Excess ethoxylated alcohol may improve hydration, but destabilizes the emulsion significantly.

SUMMARY

The present disclosure provides a friction reducing treatment solution that includes a water-in-oil emulsion comprising an oil phase and an aqueous phase, wherein the oil phase is a continuous phase comprising an inert hydrophobic liquid; wherein the aqueous phase is present as dispersed distinct particles in the oil phase and comprises water and a water soluble polymer, wherein the water soluble polymer comprises from 5 to 40 percent by weight of the water-in-oil emulsion; and an inverting surfactant present in an amount less than 5 percent by weight of the water-in-oil emulsion and comprising an alkyl propylene diamine and an ethoxylated alcohol.

Also provided is a method of treating a portion of a subterranean formation that includes the steps of: inverting a water-in-oil emulsion having an oil phase and an aqueous phase to provide a treatment fluid, wherein the oil phase is a continuous phase comprising an inert hydrophobic liquid; wherein the aqueous phase is present as dispersed distinct particles in the oil phase and comprises water and a water soluble polymer, wherein the water soluble polymer comprises from 5 to 40 percent by weight of the water-in-oil emulsion and an inverting surfactant present in an amount less than 5 percent by weight of the water-in-oil emulsion and comprising an alkyl propylene diamine and an ethoxylated alcohol; and introducing the treatment fluid into the portion of the subterranean formation.

Another embodiment includes a method of improving friction reduction properties of an aqueous treatment fluid that includes the steps of: providing a water-in-oil emulsion comprising: an oil phase and an aqueous phase, wherein the oil phase is a continuous phase comprising an inert hydrophobic liquid; wherein the aqueous phase is present as dispersed distinct particles in the oil phase and comprises water and a water soluble polymer, wherein the water soluble polymer comprises from 5 to 40 percent by weight of the water-in-oil emulsion; and an inverting surfactant present in an amount less than 5 percent by weight of the water-in-oil emulsion and comprising an alkyl propylene diamine and an ethoxylated alcohol; and inverting the emulsion in an aqueous treatment fluid; wherein the resultant aqueous treatment fluid has an improvement in friction reduction, when compared to a similar aqueous treatment fluid in which the inverted emulsion does not contain the alkyl propylene diamine.

In an aspect, the alkyl propylene diamine includes an alkyl group comprising from 10 to 20 carbon atoms. In another aspect, the alkyl propylene diamine is selected from oleyl propylene diamine and coco propylene diamine.

In an aspect, the water soluble polymer includes a non-ionic monomer and an anionic monomer.

In another aspect, the water soluble polymer includes a non-ionic monomer and a cationic monomer.

DETAILED DESCRIPTION

In general, compositions according to the present disclosure include a water-in-oil emulsion including an oil phase and an aqueous phase, wherein the oil phase is a continuous phase comprising an inert hydrophobic liquid; wherein the aqueous phase is present as dispersed distinct particles in the oil phase and comprises water and a water soluble polymer, wherein the water soluble polymer comprises from 5 to 40 percent by weight of the water-in-oil emulsion; and an inverting surfactant present in an amount less than 5 percent by weight of the water-in-oil emulsion and comprising an alkyl propylene diamine and an ethoxylated alcohol. Surprisingly, the emulsions exhibit a fast hydration rate and are stable under a variety of conditions. The resultant aqueous treatment fluid has an improvement in friction reduction, when compared to a similar aqueous treatment fluid in which the inverted emulsion does not contain the alkyl propylene diamine.

The term "friction reducing polymer" refers to a polymer that reduces losses due to friction between an aqueous fluid in turbulent flow and tubular goods, e.g. pipes, coiled tubing, and the like, and/or formation. It is added to slick water treatments at concentrations of 0.1 to 5 pounds per 1000 gallons of stimulation fluid. In other embodiments, the friction reducing polymer is added at a concentration of 0.25 to about 2.5 pounds per 1000 gallons of stimulation fluid.

Water-in-oil emulsions, or oil-external emulsions, for use in the present disclosure are emulsions where a water soluble (e.g. friction reducing) polymer of the present embodiments is suspended in a water-in-oil emulsion, the emulsion may include an inverting surfactant, water, a water soluble polymer, an inert hydrophobic liquid, and an emulsifier.

As used herein, the terms "invert" and/or "inverting" refer to exposing the water-in-oil emulsion to conditions that cause the aqueous phase to become the continuous phase. The inverting surfactant should be present in an amount sufficient to provide the desired inversion of the emulsion upon contact with water in the aqueous treatment fluid. Methods of inverting water soluble polymer containing water-in-oil emulsions are disclosed, as a non-limiting example in U.S. Pat. No. 3,624,019 which is incorporated herein by reference.

In an exemplary embodiment, the inverting surfactant is present in an amount less than 5 percent by weight of the emulsion. When a material is referred to herein as "present in an amount less than," it is understood to be present in an amount greater than zero.

Suitable inverting surfactants include combinations of alkyl propylene diamine and ethoxylated alcohol. An example of ethoxylated alcohol includes ethoxylated C12-C16 alcohol. In an embodiment, the alkyl group of the alkyl propylene diamine includes from 10 to 20 carbon atoms. In another embodiment, the alkyl group includes from 12 to 18 carbon atoms. Examples of alkyl propylene diamines include oleyl propylene diamine (DAO) and coco propylene diamine (DACO). Prior to this disclosure, alkyl propylene diamines have not been recognized as inverting surfactants. Without the benefit of this disclosure, one of skill in the art would have no reason to expect that alkyl propylene diamines could be used successfully in this way. For example, alkyl propylene diamines can be more lipophilic than hydrophilic, even insoluble in water.

The aqueous phase of the present disclosure is a dispersed phase of distinct particles in the oil phase and includes water and a water soluble polymer. The water present in the emulsions generally includes freshwater, brackish water, saltwater (e.g., water containing one or more salts dissolved therein), brine (e.g., produced from subterranean formations), seawater, pit water, pond water-or-the like, or combinations thereof. It is common for freshwater to include total dissolved solids at a level of less than 1000 ppm; brackish water to include total dissolved solids at a level of 1,000 ppm to less than 10,000 ppm; saltwater to include total dissolved solids at a level of 10,000 ppm to 30,000 ppm; and brine to include total dissolved solids at a level of greater than 30,000 ppm. Generally, the water used may be from any source, provided that it does not contain an excess of compounds that may adversely affect other components in the emulsion.

In the present disclosure, the water soluble polymer is present at a level of at least about 5, in some instances 10, in some cases at least about 15, and in other cases at least about 20 weight percent based on the weight of the water-in-oil emulsion and can be present at up to about 33, in some cases up to about 35, in other cases up to about 37 and in some instances up to about 40 weight percent based on the weight of the water-in-oil emulsion. When the amount of water soluble polymer is too low, the use of the water-in-oil emulsion may be uneconomical. When the amount of water soluble polymer is too high, the performance of the water soluble polymer may be less than optimal. The amount of water soluble polymer in the aqueous phase of the water-in-oil emulsion can be any value or can range between any of the values recited above.

As used herein, the terms "polymer," "polymers," "polymeric," and similar terms are used in their ordinary sense as understood by one skilled in the art, and thus may be used herein to refer to or describe a large molecule (or group of such molecules) that contains recurring units. Polymers may be formed in various ways, including by polymerizing monomers and/or by chemically modifying one or more recurring units of a precursor polymer. A polymer may be a "homopolymer" comprising substantially identical recurring units formed by, e.g., polymerizing a particular monomer. A polymer may also be a "copolymer" comprising two or more different recurring units formed by, e.g., copolymerizing two or more different monomers, and/or by chemically modifying one or more recurring units of a precursor polymer. The term "terpolymer" may be used herein to refer to polymers containing three or more different recurring units.

Typically, the composition of the water soluble polymer will be the same or about the same as the composition of the monomer mixture used to prepare the water soluble polymer.

The water soluble polymer in the water-in-oil emulsion is prepared by polymerizing a monomer solution that includes non-ionic monomer(s), cationic monomer(s), and/or anionic monomer(s) included at a level that provides the desired amount of water soluble polymer. In one embodiment, the water soluble polymer is a non-ionic polymer. In one embodiment, the water soluble polymer is an anionic polymer. In a particular embodiment, the anionic polymer has about 10% to about 50% charge, about 15% to about 45% charge, about 20% to about 40% charge, or about 25% to about 35% charge. In one embodiment, the water soluble polymer is a cationic polymer. In a particular embodiment, the cationic polymer has about 10% to about 50% charge.

The water soluble polymer typically includes (meth)acrylamide as a non-ionic monomer.

The water soluble polymer can include one or more non-ionic monomers to provide desirable properties to the polymer. Non-limiting examples of suitable other non-ionic monomers that can be included in the monomer mixture, and ultimately the resulting water soluble polymer include N,N-dimethyl(meth)acrylamide (DMF), N-vinyl acetamide, N-vinyl formamide, acrylonitrile (including hydrolyzed products of acrylonitrile residues), acrylonitrile-dimethyl amine reaction products, and and/or corresponding salts, non-limiting examples being sodium, potassium and/or ammonium and mixtures thereof.

The amount of non-ionic monomer in the monomer mixture used to prepare the water soluble polymer can be at least about 40, in some cases at least about 50, and in other cases at least about 60 weight percent based on the weight of the monomer mixture. When the amount of non-ionic monomer is too low, the molecular weight of the resulting water soluble polymer may be lower than desired. Also, the amount of non-ionic monomer in the monomer mixture can be up to about 100, in some case up to about 90, and in other cases up to about 80 weight percent based on the weight of the monomer mixture. The amount of non-ionic monomer in the monomer mixture can be any value or range between any of the values recited above.

In some embodiments, the water soluble polymer includes one or more anionic monomers. The term "anionic monomer" refers to a monomer which possesses a negative charge. Representative anionic monomers include (meth)acrylic acid, sodium acrylate, ammonium acrylate, 2-acrylamido-2-methylpropanesulfonic acid (AMPS), vinyl sulfonic acid, styrene sulfonic acid, maleic acid, sulfopropyl acrylate or methacrylate or other water-soluble forms of these or other polymerisable carboxylic or sulphonic acids, sulfomethylated acrylamide, allyl sulfonate, itaconic acid, acrylamidomethylbutanoic acid, fumaric acid, vinylphosphonic acid, allylphosphonic acid, phosphonomethylated acrylamide, and the like, and salts thereof. Exemplary salts of these anionic monomers include but are not limited to sodium and ammonium salts.

In some embodiments, the water soluble polymer does not include (meth)acrylic acid.

The amount of anionic monomer in the monomer mixture used to prepare the water soluble polymer can be at least about 0.5, in some cases at least about 1, in other cases at least about 2, and in other cases at least about 5 weight percent based on the weight of the monomer mixture. Also, the amount of anionic monomer in the monomer mixture can be up to about 35, in some case up to about 20, and in other cases up to about 15 weight percent based on the weight of the monomer mixture. When the amount of anionic monomer is too high, the water soluble polymer may have undesirable flocculation properties. The amount of anionic monomer in the monomer mixture can be any value or range between any of the values recited above.

In some embodiments, the water soluble polymer includes one or more cationic monomers. The term "cationic monomer" refers to a monomer which possesses a positive charge. Representative cationic monomers include dialkylaminoalkyl acrylates and methacrylates and their quaternary or acid salts, including, but not limited to, dimethylaminoethyl acrylate methyl chloride quaternary salt, dimethylaminoethyl acrylate methyl sulfate quaternary salt, dimethyaminoethyl acrylate benzyl chloride quaternary salt, dimethylaminoethyl acrylate sulfuric acid salt, dimethylaminoethyl acrylate hydrochloric acid salt, diethylaminoethyl acrylate, methyl chloride quaternary salt, dimethylaminoethyl methacrylate methyl chloride quaternary salt, dimethylaminoethyl methacrylate methyl sulfate quaternary salt, dimethylaminoethyl methacrylate benzyl chloride quaternary salt, dimethylaminoethyl methacrylate sulfuric acid salt, dimethylaminoethyl methacrylate hydrochloric acid salt, dimethylaminoethyl methacryloyl hydrochloric acid salt, dialkylaminoalkylacrylamides or methacrylamides and their quaternary or acid salts such as acrylamidopropyltrimethylammonium chloride, dimethylaminopropyl acrylamide methyl sulfate quaternary salt, dimethylaminopropyl acrylamide sulfuric acid salt, dimethylaminopropyl acrylamide hydrochloric acid salt, methacrylamidopropyltrimethylammonium chloride, dimethylaminopropyl methacrylamide methyl sulfate quaternary salt, dimethylaminopropyl methacrylamide sulfuric acid salt, dimethylaminopropyl methacrylamide hydrochloric acid salt, diethylaminoethylacrylate, diethylaminoethylmethacrylate and diallyldialkylammonium halides such as diallyldiethylammonium chloride and diallyldimethyl ammonium chloride.

The amount of cationic monomer in the monomer mixture used to prepare the water soluble polymer can be at least about 5, in some cases at least about 15, and in other cases at least about 20 weight percent based on the weight of the monomer mixture. Also, the amount of cationic monomer in the monomer mixture can be up to about 60, in some case up to about 50, in other cases up to about 40, in some instances up to about 30, and in other instances up to about 25 weight percent based on the weight of the monomer mixture. When the amount of cationic monomer is too high, the water soluble polymer may have undesirable flocculation properties when used in the present method. The amount of cationic monomer in the monomer mixture can be any value or range between any of the values recited above.

The water soluble polymers suitable for use in the present embodiments may be made in accordance with any of a variety of polymerization methods. Suitable methods to effect such polymerizations are disclosed, for example, in U.S. Pat. Nos. 3,284,393; 4,024,097; 4,059,552; 4,419,344; 4,713,431; 4,772,659; 4,672,090; 5,292,800; and 6,825,301, the relevant disclosures of which are incorporated herein by reference. In one embodiment, a suitable water soluble polymer may be prepared using emulsion polymerization. Those of ordinary skill in the art, with the benefit of this disclosure, will recognize an appropriate polymerization method to synthesize a suitable water soluble polymer. The present embodiments do not lie in the polymerization method used to synthesize the water soluble polymers of the present embodiments so long as it yields the desired water soluble polymer.

The water soluble polymers of the disclosed subject matter typically have a molecular weight sufficient to provide a desired level of activity. Generally, friction reducing polymers have a higher molecular weight in order to provide a desirable level of friction reduction. As a non-limiting example, the weight average molecular weight of the water soluble copolymers may be in the range of from about 2,000,000 to about 20,000,000, in some cases up to about 30,000,000, as determined using intrinsic viscosities. Those of ordinary skill in the art will recognize that water soluble polymers having molecular weights outside the listed range may still provide some degree of friction reduction in an aqueous treatment fluid.

As used herein, intrinsic viscosity is determined using a Ubbelhhde Capillary Viscometer and solutions of the water soluble polymer in 1M NaCl solution, at 30° C., and pH 7 at 0.05 wt. %, 0.025 wt. % and 0.01 wt. % and extrapolating the measured values to zero concentration to determine the intrinsic viscosity. The molecular weight of the water soluble polymer is then determined using the Mark-Houwink equation as is known in the art.

Alternatively, the reduced viscosity of the water soluble polymer at 0.05 wt. % concentration is used to measure molecular size. As such, the water soluble polymer has a reduced viscosity, as determined in a Ubbelhhde Capillary Viscometer at 0.05% by weight concentration of the polymer in 1M NaCl solution, at 30° C., pH 7, of from about 10 to about 40 dl/g, in some cases from 15 to about 35 dl/g, and in other cases 15 to about 30 dl/g.

Suitable water soluble polymers of the disclosure can be in an acid form or in a salt form. A variety of salts can be made by neutralizing the anionic monomer with a base, such as sodium hydroxide, potassium hydroxide, ammonium hydroxide or the like. As used herein, the term "water soluble polymer" is intended to include both the acid form of the water soluble polymer and its various salts.

In the present water-in-oil emulsion, the oil phase is present as a continuous phase and includes an inert hydrophobic liquid. The inert hydrophobic liquid can include, as non-limiting examples, paraffinic hydrocarbons, napthenic hydrocarbons, aromatic hydrocarbons, benzene, xylene, toluene, mineral oils, kerosenes, naphthas, petrolatums, branch-chain isoparaffinic solvents, branch-chain hydrocarbons, saturated, linear, and/or branched paraffin hydrocarbons and combinations thereof. Particular non-limiting examples include natural, modified or synthetic oils, mineral oil, and vegetable oils such as canola oil, coconut oil, rapeseed oil and the like.

The inert hydrophobic liquid is present in the water-in-oil emulsion in an amount sufficient to form a stable emulsion. In some embodiments, the inert hydrophobic liquid can be present in the water-in-oil emulsions in an amount in the range of from about 10% to about 80% by weight.

In embodiments of the disclosure, the inert hydrophobic liquid is present in the water-in-oil emulsion at a level of at least about 15, in some cases at least about 17.5, in other cases at least about 20, and in some instances at least about 22.5 weight percent based on the weight of the water-in-oil emulsion and can be present at up to about 40, in some cases up to about 35, in other cases up to about 32.5 and in some instances up to about 30 weight percent based on the weight of the water-in-oil emulsion. The total amount of inert hydrophobic liquid in the water-in-oil emulsion can be any value or can range between any of the values recited above.

In some embodiments, the emulsions may further comprise an emulsifier. Any suitable water-in-oil emulsifier can be used as one or more surfactants used to make the water soluble polymer containing water-in-oil emulsion of the present disclosure. In embodiments of the disclosure, the surfactants include those having an HLB (hydrophilic-lipophilic balance) value between 2 and 10 in some cases between 3 and 9 and in other cases between 3 and 7.

As used herein, HLB is calculated using the art known method of calculating a value based on the chemical groups of the molecule. The method uses the following equation:

$$HLB=7+m*Hh+n*Hl$$

where m represents the number of hydrophilic groups in the molecule, Hh represents the value of the hydrophilic groups, n represents the number of lipophilic groups in the molecule and Hl represents the value of the lipophilic groups.

The surfactants can be present at a level of at least about 0.1, in some instances at least about 0.25, in other instances at least about 0.5, in some cases at least about 0.75 and in other cases at least about 1 weight percent of the water-in-oil emulsion. When the amount of surfactants is too low, the aqueous phase may not be adequately dispersed in the oil phase and/or the water-in-oil emulsion may tend to separate into oil and aqueous phases. Also, the amount of surfactants can be up to about 7, in some cases up to about 5, and in other cases up to about 2.5 weight percent of the water-in-oil emulsion. The amount of surfactants in the water-in-oil emulsion can be any value or can range between any of the values recited above.

In some embodiments, the emulsions may further comprise an inhibitor. Among other things, the inhibitor may be included to prevent premature polymerization of the monomers prior to initiation of the emulsion polymerization reaction. As those of ordinary skill in the art will appreciate, with the benefit of this disclosure, the polymer may have been synthesized using an emulsion polymerization technique wherein the inhibitor acted to prevent premature polymerization. Examples of suitable inhibitors include, but are not limited to, quinones. An example of a suitable inhibitor comprises a 4-methoxyphenol (MEHQ). The inhibitor should be present in an amount sufficient to provide the desired prevention of premature polymerization. In some embodiments, the inhibitor may be present in an amount in the range of from about 0.001% to about 0.1% by weight of the emulsion.

In some embodiments, emulsion polymerization may be used to prepare a suitable emulsion that comprises a water soluble polymer of the present embodiments. Suitable emulsion polymerization techniques may have a variety of different initiation temperatures depending on, among other things, the amount and type of initiator used, the amount and type of monomers used, the amount and type of inhibitor used, and a number of other factors known to those of ordinary skill in the art. In one embodiment, a suitable emulsion polymerization technique may have an initiation temperature of about 25° C. Due to the exothermic nature of the polymerization reaction, the mixture may be maintained at a higher temperature than the initiation temperature during procession of the polymerization reaction, for example, in the range of from about 30° C. to about 70° C., or from about 40° C. to about 60° C.

A variety of different mixtures may be used to prepare an emulsion for use in the present embodiments. Suitable mixtures may include acrylamide and/or anionic and/or cationic monomer(s), water, a water-immiscible liquid, an initiator, and an emulsifier. Optionally, the mixture further may comprise an inhibitor, a base (e.g., sodium hydroxide) to neutralize the acrylic acid forming the salt form of the friction reducing polymer, a complexing agent to allow the gradual release of monomers in the polymerization reaction, an activator to initiate polymerization at a lower temperature, and an inverter. Those of ordinary skill in the art, with the benefit of this disclosure, will know the amount and type of components to include in the mixture based on a variety of factors, including the desired molecular weight and composition of the water soluble polymer and the desired initiation temperature.

In some embodiments of the disclosed subject matter, a batch method can be used to make down the water-in-oil emulsion. In this embodiment, the water-in-oil emulsion and water are delivered to a common mixing tank. Once in the tank, the solution is beat or mixed for a specific length of time in order to impart energy thereto. After mixing, the resulting solution must age to allow enough time for the molecules to unwind.

In some embodiments, continuous in-line mixers as well as in-line static mixers can be used to combine the water soluble polymer containing water-in-oil emulsion and water. Non-limiting examples of suitable mixers utilized for mixing and feeding are disclosed in U.S. Pat. Nos. 4,522,502; 4,642,222; 4,747,691; and 5,470,150, which are incorporated herein by reference. Non-limiting examples of suitable static mixers can be found in U.S. Pat. Nos. 4,051,065 and 3,067,987, which are incorporated herein by reference.

Once the water-in-oil emulsion is made down into water, any other additives are added to the solution to form a treatment fluid, which is then introduced into the portion of the subterranean formation.

The water present in the treatment fluid generally includes freshwater, brackish water, saltwater (e.g., water containing one or more salts dissolved therein), brine (e.g., produced from subterranean formations), seawater, pit water, pond water-or-the like, or combinations thereof. It is common for freshwater to include total dissolved solids at a level of less than 1000 ppm; brackish water to include total dissolved solids at a level of 1,000 ppm to less than 10,000 ppm; saltwater to include total dissolved solids at a level of 10,000 ppm to 30,000 ppm; and brine to include total dissolved solids at a level of greater than 30,000 ppm. Generally, the water used may be from any source, provided that it does not contain an excess of compounds that may adversely affect other components in the treatment fluid.

Generally, the water soluble polymer can be included in any aqueous treatment fluid used in subterranean treatments to reduce friction. Such subterranean treatments include, but are not limited to, drilling operations, stimulation treatments (e.g., fracturing treatments, acidizing treatments, fracture acidizing treatments), and completion operations. Those of ordinary skill in the art, with the benefit of this disclosure, will be able to recognize a suitable subterranean treatment where friction reduction may be desired.

In these applications, a fracturing fluid, i.e. well treatment fluid, can be configured as a gelled fluid, a foamed gel fluid, acidic fluids, water and potassium chloride treatments, and the like. The fluid is injected at a pressure effective to create one or more fractures in the subterranean formation. Depending on the type of well treatment fluid utilized, various additives may also be added to the fracturing fluid to change the physical properties of the fluid or to serve a certain beneficial function. In one embodiment, the fluid does not contain a sufficient amount of water soluble polymer to form a gel. Optionally, a propping agent such as sand or other hard material is added which serves to keep the fractures open after the fracturing operation. Also, fluid loss agents may be added to partially seal off the more porous sections of the formation so that the fracturing occurs in the less porous strata. Other oilfield additives that may also be added to the fracturing fluid include emulsion breakers, antifoams, scale inhibitors, $H_2S$ and or $O_2$ scavengers, biocides, crosslinking agents, surface tension reducers, breakers, buffers, surfactants and non-emulsifiers, fluorocarbon surfactants, clay stabilizers, fluid loss additives, foamers, friction reducers, temperature stabilizers, diverting agents, shale and clay stabilizers, paraffin/asphaltene inhibitors, corrosion inhibitors, and acids. For example, an acid may be included in the aqueous treatment fluids, among other things, for a matrix or fracture acidizing treatment. In fracturing embodiments, propping agent may be included in the aqueous treatment fluids to prevent the fracture from closing when the hydraulic pressure is released. In a particular embodiment, the treatment fluid further comprises a biocide.

The water soluble polymers of the present disclosure should be included in the aqueous treatment fluids of the present disclosure in an amount sufficient to provide the desired reduction of friction. In some embodiments, a water soluble polymer of the present disclosure may be present in an amount that is at least about 0.0025%, in some cases at least about 0.003%, in other cases at least about 0.0035% and in some instances at least about 0.05% by weight of the aqueous treatment fluid and can be up to about 4%, in some cases up to about 3%, in other cases up to about 2%, in some instances up to about 1%, in other instances up to about 0.02%, in some situations up to less than about 0.1%, in other situations, up to about 0.09%, and in specific situations, up to about 0.08% by weight of the aqueous treatment fluid. The amount of the water soluble polymers included in the aqueous treatment fluids can be any value or range between any of the values recited above.

In some embodiments, the water soluble polymer can be present in aqueous treatment fluids in an amount in the range of from about 0.0025% to about 0.025%, in some cases in the range of from about 0.0025% to less than about 0.01%, in other cases in the range of from about 0.0025% to about 0.009%, and in some situations in the range of from about 0.0025% to about 0.008%, by weight of the aqueous treatment fluid.

In some embodiments when the present water-in-oil emulsions are used, the amount of water soluble polymer in the aqueous treatment fluid can be at least about 5%, in some cases at least about 7.5%, in other cases at least about 10%, in some instances at least about 12.5%, in other instances at least about 15%, in some situations at least about 20%, and in other situations at least about 25% less than when water-in-oil emulsion containing a polymer of the same composition at a concentration of 30 weight percent or more are used in the in the aqueous treatment fluid.

Also provided is a method of treating a portion of a subterranean formation, which includes the steps of: inverting a water-in-oil emulsion having an oil phase and an aqueous phase to provide a treatment fluid, wherein the oil phase is a continuous phase comprising an inert hydrophobic liquid; wherein the aqueous phase is present as dispersed distinct particles in the oil phase and comprises water and a water soluble polymer, wherein the water soluble polymer comprises from 5 to 40 weight percent of the water-in-oil emulsion and an inverting surfactant present in an amount less than 5 weight percent of the water-in-oil emulsion and comprising an alkyl propylene diamine and an ethoxylated alcohol; and introducing the treatment fluid into the portion of the subterranean formation.

In other embodiments, the present disclosure provides a method of improving friction reduction properties of an aqueous treatment fluid, which includes the steps of: providing a water-in-oil emulsion comprising: an oil phase and an aqueous phase, wherein the oil phase is a continuous phase comprising an inert hydrophobic liquid; wherein the aqueous phase is present as dispersed distinct particles in the oil phase and comprises water and a water soluble polymer, wherein the water soluble polymer comprises from 5 to 40 weight percent of the water-in-oil emulsion; and an inverting surfactant present in an amount less than 5 weight percent of the water-in-oil emulsion and comprising an alkyl propylene diamine and an ethoxylated alcohol; and inverting the emulsion in an aqueous treatment fluid; wherein the resultant aqueous treatment fluid has an improvement in friction reduction, when compared to a similar aqueous treatment fluid in which the inverted emulsion does not contain the alkyl propylene diamine.

Aqueous treatment fluids of the present embodiments may be used in any subterranean treatment where the reduction of friction is desired. Such subterranean treatments include, but are not limited to, drilling operations, stimulation treatments, and completion operations. Those of ordinary skill in the art, with the benefit of this disclosure, will be able to recognize a suitable subterranean treatment where friction reduction may be desired.

While specific embodiments are discussed, the specification is illustrative only and not restrictive. Many variations of this disclosure will become apparent to those skilled in the art upon review of this specification.

Unless defined otherwise, all technical and scientific terms used herein have the same meaning as is commonly understood by one of skill in the art to which this specification pertains.

As used in the specification and claims, the singular form "a", "an" and "the" includes plural references unless the context clearly dictates otherwise.

As used herein, and unless otherwise indicated, the term "about" or "approximately" means an acceptable error for a particular value as determined by one of ordinary skill in the art, which depends in part on how the value is measured or determined. In certain embodiments, the term "about" or "approximately" means within 1, 2, 3, or 4 standard deviations. In certain embodiments, the term "about" or "approximately" means within 50%, 20%, 15%, 10%, 9%, 8%, 7%, 6%, 5%, 4%, 3%, 2%, 1%, 0.5%, or 0.05% of a given value or range.

Also, it should be understood that any numerical range recited herein is intended to include all sub-ranges subsumed therein. For example, a range of "1 to 10" is intended to include all sub-ranges between and including the recited minimum value of 1 and the recited maximum value of 10; that is, having a minimum value equal to or greater than 1 and a maximum value of equal to or less than 10. Because the disclosed numerical ranges are continuous, they include every value between the minimum and maximum values. Unless expressly indicated otherwise, the various numerical ranges specified in this application are approximations.

The present disclosure will further be described by reference to the following examples. The following examples are merely illustrative and are not intended to be limiting. Unless otherwise indicated, all percentages are by weight of the total composition.

Example 1

Ingredients of the final inverse emulsions are shown in Table A. In all examples, the base emulsion was a 30% active poly(acrylamide-co-acrylic acid) inverse emulsion. Inverting surfactant(s) were added slowly to the base emulsion and mixed for 30 minutes to yield the final emulsion. C12 linear alcohol, 9 moles of EO (LA-9) or 12 moles of EO (LA-12) and oleyl propylene diamine (DAO) were tested as the inverting surfactant(s).

TABLE A

| Identifier | Compositions |
| --- | --- |
| Control A | 30% active poly(acrylamide-co-acrylic acid) inverse emulsion<br>1.5% by weight C12 linear alcohol, 9 moles of EO (LA-9) |
| Control B | 30% active poly(acrylamide-co-acrylic acid) inverse emulsion<br>2.0% by weight C12 linear alcohol, 9 moles of EO (LA-9) |
| Control C | 30% active poly(acrylamide-co-acrylic acid) inverse emulsion<br>1.0% by weight C12 linear alcohol, 12 moles of EO (LA-12) |
| Inventive Composition A | 30% active poly(acrylamide-co-acrylic acid) inverse emulsion<br>0.2% by weight DAO<br>1.3% by weight C12 linear alcohol, 9 moles of EO (LA-9) |
| Inventive Composition B | 30% activo poly(acrylamide-co-acrylic acid) inverse emulsion<br>0.5% by weight DAO<br>1.0% by weight C12 linear alcohol, 9 moles of EO (LA-9) |
| Inventive Composition C | 30% active poly(acrylamide-co-acrylic acid) inverse emulsion<br>1.0% by weight DAO<br>0.5% by weight C12 linear alcohol, 9 moles of EO (LA-9) |
| Inventive Composition D | 30% active poly(acrylamide-co-acrylic acid) inverse emulsion<br>0.5% by weight DAO<br>1.0% by weight C12 linear alcohol, 12 moles of EO (LA-12) |

Flow Loop Testing

The flow loop test is used by the Oil & Gas industry to evaluate the performance of polyacrylamide inverse emulsions as friction reducers. A higher percentage friction reduction and fast inversion after the polymer is injected to water represent a favorable performance. A friction flow loop was constructed from 5/16" inner diameter stainless steel tubing, approximately 30 feet in overall length. Test solutions were pumped out of the bottom of a tapered 5 gallon reservoir. The solution flowed through the tubing and was returned back into the reservoir.

The flow was achieved using a plunger pump equipped with a variable speed drive. Pressure was measured from two inline gages, with the last gauge located approximately 2 feet from the discharge back into reservoir. Four gallons of 100 K ppm total dissolved solid (TDS) synthetic brine was prepared in the sample reservoir, and the pump was started and set to deliver a flow rate of 5 gal/min. The salt solution was recirculated until the temperature equilibrated at 25° C. and a stabilized pressure differential was achieved. This pressure was recorded as the "initial pressure" of the 2% KCl solution.

The test amount of neat water-in-oil emulsion polymer was quickly injected with a syringe into the sample reservoir containing the 100 K TDS water and a timer was started. The dose was recorded as gallons of water-in-oil emulsion per thousand gallons of 100 K TDS (gpt). The pressure was reported at 30 seconds, 1 min, 3 min and 5 min respectively.

The pressure drop was calculated at each time interval comparing it to the initial pressure differential reading of the 100 K TDS solution. The percentage friction reduction was determined as described in U.S. Pat. No. 7,004,254 at col. 9, line 36 to col. 10, line 43. The results are shown in Table B, dose is the amount of water-in-oil emulsion used as gallons per thousand gallons and the active dose the amount of polymer used as weight percent of the 100 K TDS treatment fluid. Highest achievable friction reduction in this test is about 65%.

TABLE B

| Emulsion Sample | Inverting surfactant weight Ratio | Test Water (ppm TDS) | Dosage | 30 sec. | 1 min | 3 min | 5 min |
| --- | --- | --- | --- | --- | --- | --- | --- |
| Control A | 1.50% | 100K | 0.5 gpt | 27 | 40 | 51 | 51 |
| Control B | 2.00% | 100K | 0.5 gpt | 44 | 55 | 59 | 56 |
| Composition A | 1.50% | 100K | 0.5 gpt | 24 | 43 | 64 | 63 |
| Composition B | 1.50% | 100K | 0.5 gpt | 54 | 63 | 63 | 58 |
| Composition C | 1.50% | 100K | 0.5 gpt | 50 | 59 | 63 | 60 |
| Composition D | 1.50% | 150K | 0.5 gpt | 53 | 61 | 63 | 60 |

The data show several trends. First, with the same ratio inverting surfactant, Inventive Compositions A (0.2% DAO), B (0.5% DAO), and C (1.0% DAO) all show higher friction reduction than Control A, which only has LA-9 present as the inverting surfactant. These examples demonstrate that even a small percentage of DAO significantly improves the friction reduction performance.

Furthermore, friction reduction of Inventive Compositions B and C is superior to that of Control B (higher loading of LA-9). It is also surprising that Inventive Composition A, exhibited good stability at high temperature (up to 80°) C. and low temperature (as low as −40°) C. In contrast, Control B turned into paste after storage at −30° C. followed by thaw at room temperature.

Example 2

Inventive composition D included DAO with C12 linear alcohol, 12 moles EO (LA-12) as inverting surfactant for the polyacrylamide inverse emulsion. DAO 0.5% by weight and LA-12 1.0% by weight were added and mixed with the base inverse emulsion for 30 min. The final emulsion was stable under high temperature 50° C. and low temperature −30° C.

It also demonstrated surprising friction reduction performance even in higher brine (150 K ppm TDS).

Example 3

Inverse emulsion samples were hydrated using a Waring blender at 1200 rpm for 1 minute. Viscosities were measured using a Fann Model 35 or similar viscometer. Composition D exhibited significantly higher viscosity compared to Control C in water with differing amounts of TDS. Viscosity build by the polyacrylamide inverse emulsion after combining with water is an important property for oilfield use. In oil field applications, it is desirable for emulsions to build high viscosities within seconds or minutes of mixing with water.

TABLE C

|  | 4 gpt Viscosity (cP) in Tap Water | | 4 gpt Viscosity (cP) in 5K ppm TDS Water | | 4 gpt Viscosity (cP) in 25K ppm TDS Water | |
| --- | --- | --- | --- | --- | --- | --- |
| Emulsion Sample | 170 $s-1$ | 511 $s-1$ | 170 $s-1$ | 511 $s-1$ | 170 $s-1$ | 511 $s-1$ |
| Control C | 21 | 15 | 9 | 6 | 6 | 3 |
| Composition D | 33 | 22 | 12 | 10 | 9 | 6 |

The disclosed subject matter has been described with reference to specific details of particular embodiments thereof. It is not intended that such details be regarded as limitations upon the scope of the disclosed subject matter except insofar as and to the extent that they are included in the accompanying claims.

Therefore, the exemplary embodiments described herein are well adapted to attain the ends and advantages mentioned as well as those that are inherent therein. The particular embodiments disclosed above are illustrative only, as the exemplary embodiments described herein may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope and spirit of the exemplary embodiments described herein. The exemplary embodiments described herein illustratively disclosed herein suitably may be practiced in the absence of any element that is not specifically disclosed herein and/or any optional element disclosed herein. While compositions and methods are described in terms of "comprising," "containing," or "including" various components or steps, the compositions and methods can also "consist essentially of" or "consist of" the various components, substances and steps. As used herein the term "consisting essentially of" shall be construed to mean including the listed components, substances or steps and such additional components, substances or steps which do not materially affect the basic and novel properties of the composition or method. In some embodiments, a composition in accordance with embodiments of the present disclosure that "consists essentially of" the recited components or substances does not include any additional components or substances that alter the basic and novel properties of the composition. If there is any conflict in the usages of a word or term in this specification and one or more patent or other documents that may be incorporated herein by reference, the definitions that are consistent with this specification should be adopted.

We claim:

1. A friction reducing treatment solution comprising:
   a water-in-oil emulsion comprising an oil phase and an aqueous phase,
      wherein the oil phase is a continuous phase comprising an inert hydrophobic liquid;
      wherein the aqueous phase is present as dispersed distinct particles in the oil phase and comprises water and a water soluble polymer, wherein the water soluble polymer comprises from 5 to 40 percent by weight of the water-in-oil emulsion; and
   an inverting surfactant present in an amount less than 5 percent by weight of the water-in-oil emulsion and comprising an alkyl propylene diamine and an ethoxylated alcohol.

2. The treatment solution of claim 1, where the alkyl propylene diamine comprises an alkyl group comprising from 10 to 20 carbon atoms.

3. The treatment solution of claim 1, wherein the alkyl propylene diamine is selected from the group consisting of oleyl propylene diamine and coco propylene diamine.

4. The treatment solution of claim 1, wherein the water soluble polymer comprises a non-ionic monomer and an anionic monomer.

5. The treatment solution of claim 4, wherein the non-ionic monomer is acrylamide.

6. The treatment solution of claim 4, wherein the anionic monomer is selected from the group consisting of (meth)acrylic acid, sodium acrylate, ammonium acrylate, 2-acrylamido-2-methylpropanesulfonic acid, vinyl sulfonic acid, styrene sulfonic acid, maleic acid, sulfopropyl acrylate, sulfopropyl methacrylate, sulfomethylated acrylamide, allyl sulfonate, itaconic acid, acrylamidomethylbutanoic acid, fumaric acid, vinylphosphonic acid, allylphosphonic acid, phosphonomethylated acrylamide, and salts thereof.

7. The treatment solution of claim 1, wherein the water soluble polymer comprises a non-ionic monomer and a cationic monomer.

8. A method of treating a portion of a subterranean formation, comprising:
   a. inverting a water-in-oil emulsion having an oil phase and an aqueous phase to provide a treatment fluid, wherein the oil phase is a continuous phase comprising an inert hydrophobic liquid; wherein the aqueous phase is present as dispersed distinct particles in the oil phase and comprises water and a water soluble polymer, wherein the water soluble polymer comprises from 5 to 40 percent by weight of the water-in-oil emulsion and an inverting surfactant present in an amount less than 5 percent by weight of the water-in-oil emulsion and comprising an alkyl propylene diamine and an ethoxylated alcohol; and
   b. introducing the treatment fluid into the portion of the subterranean formation.

9. The method of claim 8, wherein the alkyl propylene diamine is selected from the group consisting of oleyl propylene diamine and coco propylene diamine.

10. The method of claim 8, wherein the water soluble polymer comprises a non-ionic monomer and an anionic monomer.

11. The method of claim 10, wherein the non-ionic monomer is acrylamide.

12. The method of claim 8, wherein the water soluble polymer comprises a non-ionic monomer and a cationic monomer.

13. A method of improving friction reduction properties of an aqueous treatment fluid, comprising:
  a. providing a water-in-oil emulsion comprising:
    i. an oil phase and an aqueous phase, wherein the oil phase is a continuous phase comprising an inert hydrophobic liquid;
    ii. wherein the aqueous phase is present as dispersed distinct particles in the oil phase and comprises water and a water soluble polymer, wherein the water soluble polymer comprises from 5 to 40 percent by weight of the water-in-oil emulsion; and
    iii. an inverting surfactant present in an amount less than 5 percent by weight of the water-in-oil emulsion and comprising an alkyl propylene diamine and an ethoxylated alcohol; and
  b. inverting the emulsion in an aqueous treatment fluid;
  wherein the resultant aqueous treatment fluid has an improvement in friction reduction, when compared to a similar aqueous treatment fluid in which the inverted emulsion does not contain the alkyl propylene diamine.

14. The method of claim 13, wherein the alkyl propylene diamine is selected from the group consisting of oleyl propylene diamine and coco propylene diamine.

15. The method of claim 13, wherein the water soluble polymer comprises a non-ionic monomer and an anionic monomer.

16. The method of claim 15, wherein the non-ionic monomer is acrylamide.

17. The method of claim 13, wherein the water soluble polymer comprises a non-ionic monomer and a cationic monomer.

\* \* \* \* \*